Figure 3:
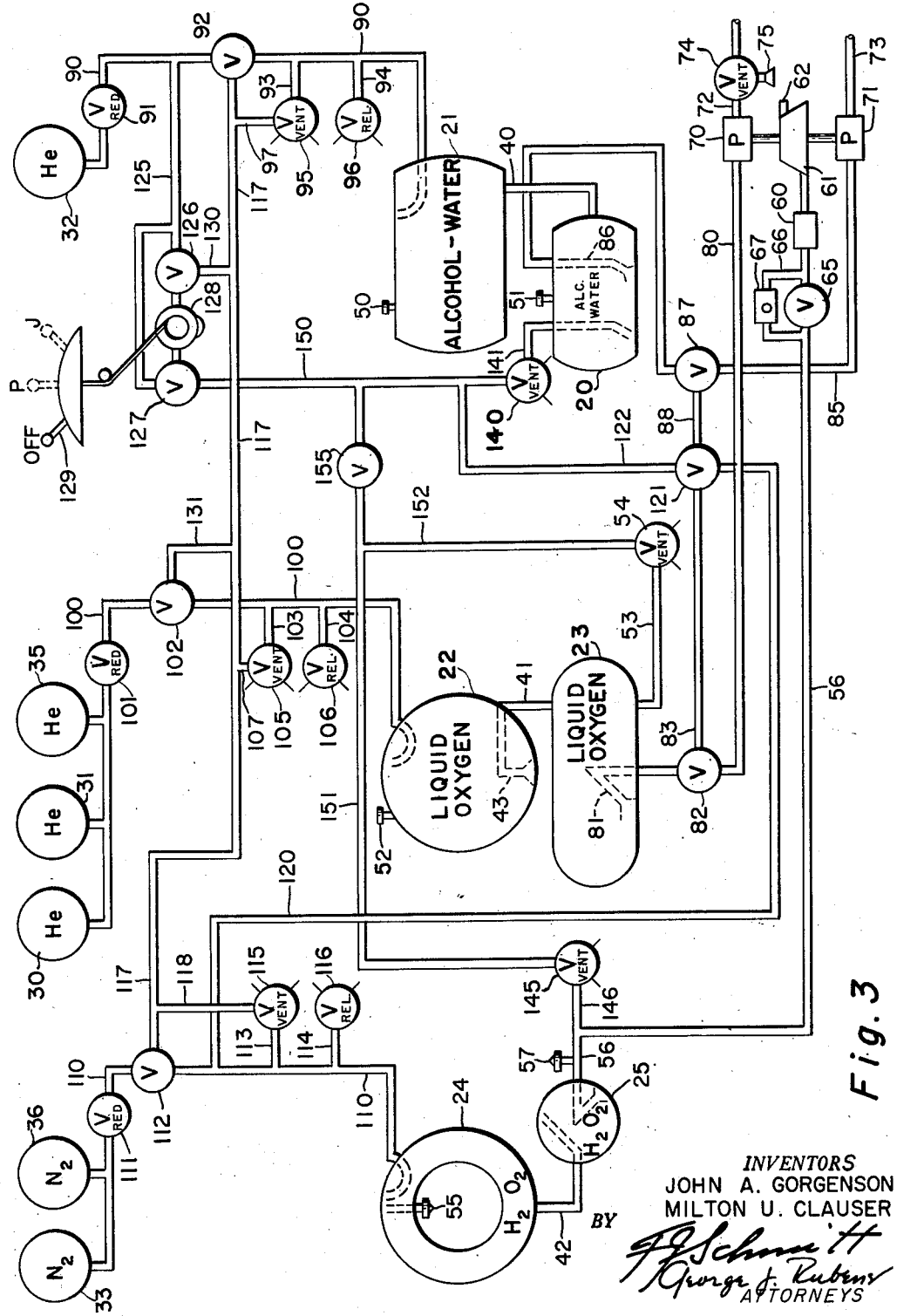

May 7, 1957 J. A. GORGENSON ET AL 2,791,087
LIQUID PROPELLANT TRANSFER SYSTEM
Filed Dec. 7, 1955 2 Sheets-Sheet 1
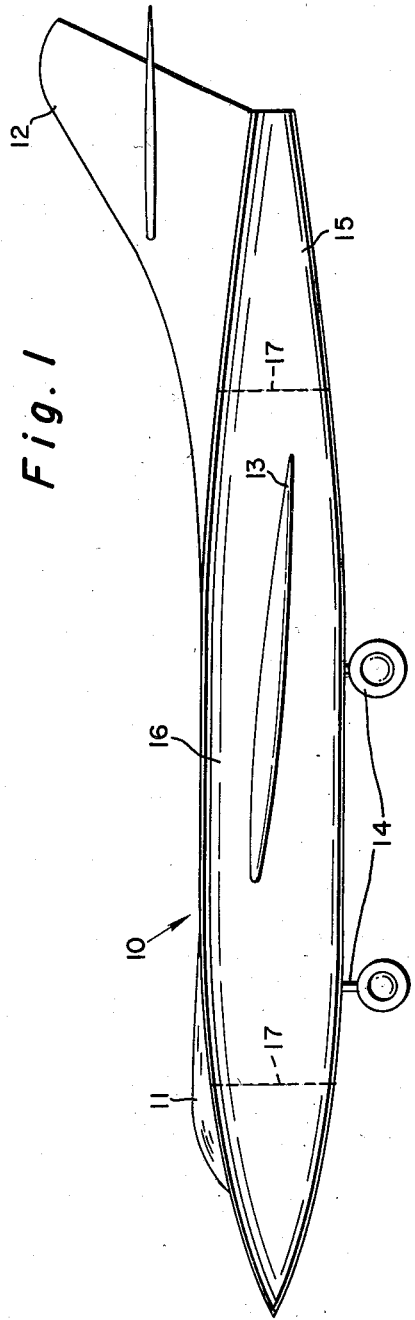
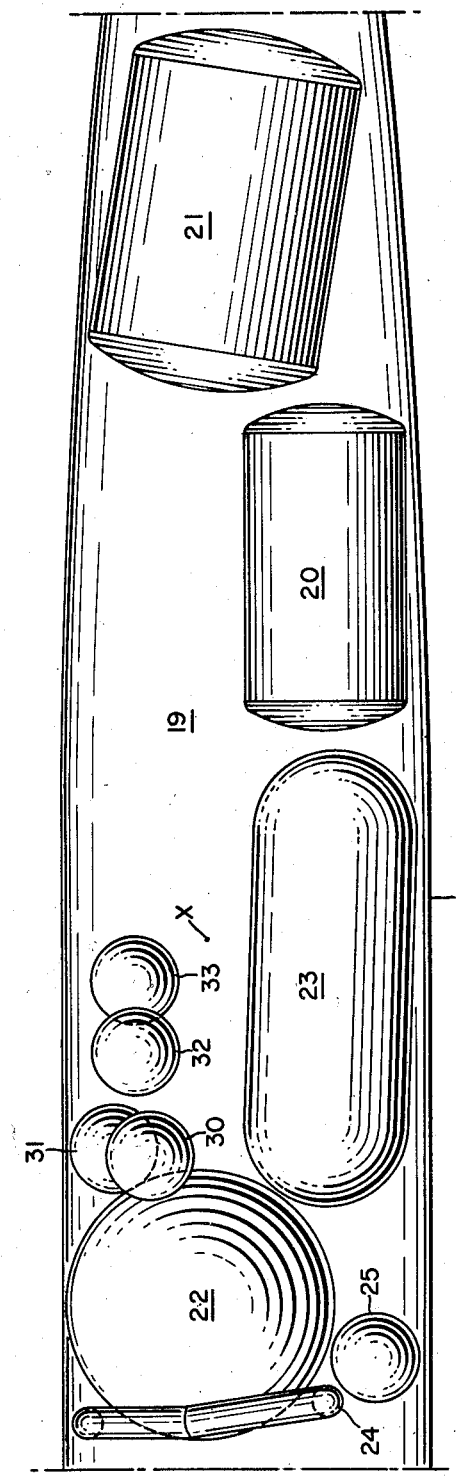
INVENTORS
JOHN A. GORGENSON
MILTON U. CLAUSER
BY
*ATTORNEYS*

INVENTORS
JOHN A. GORGENSON
MILTON U. CLAUSER
BY
ATTORNEYS

United States Patent Office 2,791,087
Patented May 7, 1957

2,791,087

LIQUID PROPELLANT TRANSFER SYSTEM

John A. Gorgenson, Palos Verdes, and Milton U. Clauser, Palos Verdes Estates, Calif., assignors, by mesne assignments, to the United States of America as represented by the Secretary of the Navy Application December 7, 1955, Serial No. 551,711

15 Claims. (Cl. 60—35.6)

The present invention relates to a new and novel liquid propellant transfer system for rocket engines and more particularly to such a system employing an arrangement wherein three different liquid propellants, e. g. fuels and oxidizers, are transferred from tanks to the desired position through completely independent conduits such that there is no possible intermingling of the propellants, and the system is so interconnected as to permit selective actuation of certain components of the system to produce liquid flow through the various conduits in predetermined sequence under complete control of the pilot of the aircraft.

In the latest type of experimental aircraft, liquid propellant rocket engines are utilized to obtain the high speeds necessary to determine and predict the operational characteristics of aircraft at supersonic speeds. As is well known, liquid propellants employed in such engines are highly explosive and present an extreme hazard since the least amount of leakage of the propellants or malfunction of the transfer system is liable to cause an explosion and complete destruction of the aircraft. As a result, it is necessary to employ a transfer system which provides maximum safety and reliability in operation.

Prior art systems employ arrangements wherein the various liquid propellants are not completely isolated from one another and it is possible for one propellant to leak from its portion of the system into another portion and mingle with another of the propellants with disastrous results since such propellants are ordinarily explosive upon coming into contact with one another. A well known example of such liquid propellants is a dual propellant system employing a first propellant composed of an alcohol and water mixture and a second propellant consisting of liquid oxygen. Furthermore, such rocket engines have usually been employed in pilotless vehicles which are somewhat expendable, and consequently the safety of the transfer system is not a critical factor.

The invention system is adapted for use in a piloted aircraft and accordingly has been designed such that it provides maximum safety and reliable operation with a minimum of pilot effort and attention. There are no interconnecting conduits whereby one propellant may come into contact with another propellant prior to entry in the combustion chambers of the engines of the aircraft, and in this manner explosions due to leakage and premature contact between the propellants are eliminated. Automatic vents are provided for propellant tanks to prevent the build-up of dangerous gas pressures within the tanks and additional means are provided for jettisoning the propellants prior to landing thereby reducing the weight and the landing speed of the aircraft and eliminating as far as possible the likelihood of fire and explosion after landing.

The invention system is especially adapted for use in a high speed experimental aircraft which due to its operational characteristics must be extremely rigid and strong in construction. Consequently, the fuselage of the aircraft is heavily cross-braced and there is no single large compartment in which the propellant tanks may be readily positioned, but on the contrary only a number of relatively small odd-shaped compartments are available to receive the tanks.

It is therefore necessary to provide a plurality of odd-shaped tanks as of necessity, but this feature has been utilized to solve another problem encountered in such aircraft. Due to the large amounts of propellant which must be carried which accordingly are quite heavy and also due to the rapid consumption of the propellants, it is quite a problem to control the shift of the center of gravity of the aircraft as the propellants are consumed. Accordingly, each of the propellants employed in the invention system is contained in a pair of tanks and the system is so constructed that fuel is fed from a lower tank of each pair of tanks to the engines; and the upper tank of each pair of tanks continuously feeds into the respective lower tank such that the lower tank is maintained completely full until the upper tank is empty whereupon the lower tank in turn empties. The lower tanks which are the last to empty are positioned closer to the center of gravity of the plane such that the center of gravity shift is minimized. Furthermore the tanks are located such that a fire seal may be inserted in the fuselage to further ensure that there is no accidental mixing of the rocket propellants.

An object of the present invention is the provision of a liquid propellant transfer system for rocket engines which provides maximum safety to the pilot, eliminating any accidental intermingling of the rocket propellants.

Another object is to provide a transfer system which is largely automatic in operation and requires a minimum of the pilot's attention.

A further object of the invention is the provision of a transfer system which minimizes the center of gravity shift of an aircraft during consumption of the propellants.

Still another object is to provide a transfer system which employs a minimum of components yet is thoroughly reliable in operation.

Other objects and many of the attendant advantages of this invention will be readily appreciated as the same becomes better understood by reference to the following detailed description when considered in connection with the accompanying drawings wherein:

Fig. 1 is a side view of an experimental-type aircraft utilizing the invention system, Fig. 2 is an enlarged view of a portion of the aircraft shown in Fig. 1 with the side removed illustrating diagrammatically the location of the tanks relative to the fuselage of the aircraft, and Fig. 3 is a schematic layout of the invention system.

Referring now to the drawings wherein like reference characters designate like or corresponding parts throughout the several views, there is shown in Fig. 1 an experimental-type aircraft 10 having a cockpit 11, a tail assembly 12, a wing 13, and an undercarriage 14 as in conventional aircraft. The rear portion 15 of the fuselage contains the rocket engines and the major portion 16 of the fuselage is employed for containing the transfer system. Portion 16 of the fuselage extends between the two dotted lines 17 as indicated in Fig. 1, and an enlarged diagrammatic view of this portion is shown in Fig. 2 with the side of the fuselage removed to disclose the relationship of the tanks to the fuselage.

Referring now to Fig. 2, a first pair of substantially cylindrical closed hollow tanks 20 and 21 which are suitably connected in communication with one another as hereinafter described are positioned in the after end of compartment 19 formed within the fuselage between dotted lines 17 in Fig. 1 and these two tanks are adapted to contain an alcohol and water mixture which serves as one of the liquid propellants for the rocket engines.

A second pair of closed hollow tanks 22 and 23 are positioned forwardly of tanks 20 and 21 and they are suitably connected in communication with one another as hereinafter described. Tank 22 is substantially spherical and tank 23 is substantially cylindrical, these tanks being adapted to contain liquid oxygen which serves as the oxidizer for the engines of the aircraft. A third pair of closed hollow tanks 24 and 25 are positioned at the extreme forward position of compartment 19 and are suitably connected in communication with one another as hereinafter described. Tank 24 has a generally torus configuration whereby it is adapted to fit over the forward portion of tank 22, and tank 25 is substantially spherical, tanks 24 and 25 being adapted to contain hydrogen peroxide which serves as a propellant for driving a small turbine which in turn drives the pumps of the invention system.

Three closed hollow spherical containers 30, 31 and 35 are disposed symmetrically about the longitudinal axis of the aircraft only two of the containers 30 and 31 being visible in Fig. 2, the third container 35 being hidden directly behind container 30 and container 31 lying between the other two containers. Three more similar containers 32, 33 and 36 are also disposed symmetrically about the longitudinal axis of the aircraft, only two of such containers 32 and 33 being shown in Fig. 2, the third container 36 being hidden directly behind sphere 32. In this second group of spheres, sphere 33 lies between the other two spheres. Each of the spherical containers is adapted to contain various gases under pressure, and suitable connections are provided to the propellant tanks as will be hereinafter more fully described.

Each of the pairs of tanks is arranged such that the liquid is displaced from the upper tanks to the lower tanks and from the lower tanks to the pumps and the driving mechanism therefor. It should be noted that the pairs of tanks 20, 21 and 22, 23 contain the bulk of the liquid and consequently have the greatest effect on the shift of the center of gravity of the aircraft during flight. Tanks 20, 23 which are the last to empty are located closest to the initial center of gravity as indicated by the point X. It is therefore apparent that the center of gravity shift will consequently be minimized. The tanks preferably employ flexible tubing in conjunction with the nozzles of the propellant tank pickups as shown for example in United States Patent No. 1,871,055 thereby insuring a constant propellant flow regardless of the position of the aircraft and during various maneuvers.

Referring now to Fig. 3, tanks 20–25 are schematically shown in the same general relationship to one another as shown in Fig. 2, however containers 30–33 have been rearranged to facilitate an understanding of the connections between the containers and the tanks. The container 35 which was hidden by tank 30 in Fig. 2 is shown in Fig. 3 and the container 36 which was hidden by container 32 in Fig. 2 is also shown in Fig. 3. Each of the upper propellant tanks 21, 22, and 24 is connected to the lower propellant tanks 20, 23 and 25 by conduits 40, 41 and 42 respectively. It should be noted that conduit 41 is provided with a flexible pickup 43 as previously described within tank 22.

Tank 21 is provided in the upper portion thereof with a filler opening and manually operable filler cap 50 which may be removed to enable tanks 20 and 21 to be substantially filled with the alcohol and water mixture. Lower tank 20 is provided in its upper wall with a filling vent opening and a manually operable filling vent cap 51 which is removed during filling of tank 20 to prevent air or other vapors from being trapped in the upper portion of tank 20.

Tank 22 is similarly provided with a filling vent opening and a cap 52 therefor whereby tank 22 is vented during filling to prevent the trapping of air or other vapors during the filling of tanks 22 and 23 with liquid oxygen. Lower tank 23 is connected to a jettison conduit 53 which is connected to a jettison valve 54 hereinafter described. Valve 54 also serves to provide a filling connection for tanks 23, and consequently tanks 22 and 23 are filled by pumping oxygen through valve 54 which may be manually opened and through conduit 53 into tanks 22 and 23.

Tank 24 is also provided with a manually operable filling vent 55 and lower tank 25 is connected to a propellant conduit 56 to which is connected a filler valve 57 whereby hydrogen peroxide may be pumped into tanks 24 and 25 through valve 57 with the filling vent valve 55 open to prevent air and vapors from being trapped in the upper portion of the donut-shaped tank 24.

Conduit 56 is provided with a flexible pickup in tank 25 and is also connected to a conventional catalyst chamber 60 which contains a suitable catalyst such as manganese dioxide whereby steam will be generated in a well-known manner when hydrogen peroxide is fed into the chamber. The outlet of the chamber is connected to a conventional small steam turbine 61 and the steam is exhausted overboard by a nozzle 62 suitably communicating with the exterior of the aircraft.

A valve 65 which is remotely controlled from the cockpit is connected to conduit 56 and is initially biased to closed position such that hydrogen peroxide may not flow beyond valve 65 into the catalyst chamber 60. A bypass conduit 66 is provided around valve 65 and the bypass conduit includes a small orifice indicated schematically at 67 which serves to meter a small amount of hydrogen peroxide into the catalyst chamber as will be hereinafter more fully described.

Two conventional fuel pumps 70, 71 are suitably geared to the turbine such that upon actuation of the turbine both pumps will be simultaneously driven thereby. Conduits 72, 73 connected to the outlets of the pumps communicate with conventional liquid rocket engines in the after portion of the aircraft. A priming valve 74 is connected to conduit 72 and serves to exhaust conduit 72 overboard through a nozzle 75. The priming valve is initially biased to closed position and may be remotely controlled from the cockpit by suitable connections. The purpose and operation of valve 74 will be hereinafter more fully described.

Lower liquid oxygen tank 23 is connected to a propellant conduit 80 which provides communication between tank 23 and pump 70, and it should be noted that conduit 80 is provided with a flexible pickup 81 within the tank. A shut-off valve 82 is connected to conduit 80 and is initially biased to closed position thereby preventing the flow of liquid oxygen from tank 23 to pump 70. Valve 82 is of the conventional on-off type and may be actuated to open position when subjected to fluid pressure through a conduit 83 as more fully hereinafter described.

The alcohol and water mixture tank 20 is connected to a conduit 85 which provides communication between tank 20 and pump 71, and it should be noted that conduit 85 is provided with a flexible pickup 86 within tank 20. A shutoff valve 87 is connected to conduit 85 and is initially biased to closed position. Valve 87 is similar to valve 82 and is adapted to be actuated to open position when subjected to fluid pressure through a conduit 88 as more fully hereinafter described.

Container 32 is filled with a suitable gas such as helium which is compatible with the alcohol and water mixture contained in tanks 20 and 21 and is connected through a conduit 90 to the upper portion of tank 21. A pressure reducing valve 91 is connected to conduit 90, suitably reducing the pressure of the helium gas before it enters tank 21. A pressure valve 92 is connected to conduit 90 and is similar to valves 82 and 87, being initially biased to closed position thereby preventing flow of helium into tank 21. It is apparent that when valve 92 is opened, the pressurized helium entering the upper portion of tank 21 will serve to force the alcohol and water mixture completely out of both tanks to pump 71. Conduit 90 is connected through auxiliary conduits 93 and 94 to a vent valve 95 and a pressure relief valve 96 respectively which are adapted to vent tank 21 overboard. Valve 95 is initially biased to closed position and is adapted to be actuated to open position when subjected to fluid pressure through conduit 97 as more fully hereinafter described. Valve 96 is spring loaded to closed position and is set to open when subjected to a predetermined pressure thereby preventing the development of excessive vapor pressure within tank 21.

Containers 30, 31 and 35 also contain helium and are connected in parallel to a conduit 100 which provides communication between the containers and the upper portion of liquid oxygen tank 22. Conduit 100 is provided with a pressure reducing valve 101 similar to valve 91 and a pressure valve 102 similar to valve 92. Conduit 100 is connected through auxiliary conduits 103 and 104 to a vent valve 105 similar to valve 95 and a pressure relief valve 106 similar to valve 96, both of the latter valves serving to exhaust tank 22 overboard. The purpose and operation of valves 101, 102, 105 and 106 is identical with that of valves 91, 92, 95 and 96 respectively, and conduit 107 which is similar to conduit 97 is adapted to provide fluid pressure for opening valve 105 as more fully hereinafter described.

Containers 33 and 36 contain a suitable gas under pressure, such as nitrogen, which is compatible with hydrogen peroxide, the tanks being connected in parallel to a conduit 110 which provides communication between the containers and upper portion of tank 24. Conduit 110 is provided with a pressure reducing valve 111 similar to valve 101 and a pressure valve 112 similar to valve 102, valve 112 being initially biased to closed position thereby preventing flow of nitrogen into the upper portion of hydrogen peroxide tank 24. Conduit 110 is connected through auxiliary conduits 113 and 114 to a vent valve 115 similar to valve 105 and a pressure relief valve 116 similar to valve 106, both of the latter valves serving to exhaust tank 24 overboard. The purpose and operation of valves 111, 112, 115, and 116 is identical with that of valves 101, 102, 105, and 106 respectively, and conduit 118 which is similar to conduit 107 is adapted to provide fluid pressure for opening valve 115 as more fully hereinafter described.

A conduit 120 has one end thereof connected to conduit 110 and the opposite end thereof connected to a shut-off control valve 121 which is normally biased to open position thereby providing communication between conduit 120 and conduits 83 and 88. A conduit 122 is in communication with valve 121 and is adapted to transmit fluid pressure to the valve for closing it and interrupting communication between conduit 120 and conduits 83 and 88 as hereinafter more fully described. It is apparent that when valve 112 is open, nitrogen under pressure passes through conduit 120, valve 121 and conduits 83 and 88 into valves 82 and 87 to open the latter valves which are initially closed.

A conduit 125 is connected at one end to conduit 90 above valve 92 and the opposite end thereof is diverted into two branches one of which provides fluid pressure to a pressure control valve 126 and the other of which provides fluid pressure to a jettison control valve 127. Valves 126 and 127 are normally biased to closed position and it is apparent that conduit 125 provides fluid pressure to these two control valves at all times. A cam indicated schematically at 128 is adapted to actuate each of valves 126 and 127 to open position and is suitably connected to the cockpit such that it may be remotely controlled by a lever 129 which is indicated as being in off position and which may be successively moved to the P or pressurizing position and the J or jettisoning position.

A short connecting conduit 130 provides communication between pressure control valve 126 and conduit 117 one end of which is connected to valve 112 and the other end of which is connected to valve 92. A branch conduit 131 provides communication between conduit 117 and valve 102, and the aforementioned conduits 97 and 107 provide communication between conduit 117 and valves 95, and 105 respectively. It is accordingly apparent that when control 129 is moved to the P position, valve 126 will open permitting helium from container 32 to actuate pressure valves 92, 102 and 112 into open position and to close vent valves 95, 105 and 115.

A jettison valve 140 is connected to tank 20 by conduit 141 and is adapted to jettison the alcohol and water mixture in tanks 20 and 21 overboard. A similar valve 54 as previously mentioned is adapted to jettison the liquid oxygen in tanks 22 and 23. A third jettison valve 145 is connected by conduit 146 to propellant conduit 56 whereby the hydrogen peroxide in tanks 24 and 25 may also be jettisoned. A conduit 150 connects the jettison control valve 127 with valve 140 and previously mentioned conduit 122 is connected in communication with conduit 150. A conduit 151 provides communication between conduit 150 and valve 145, and a conduit 152 provides communication between conduit 150 and valve 54. Each of valves 140, 54 and 145 is normally biased to closed position and is adapted to open when subjected to fluid pressure upon opening of the jettison control valve. A manually controlled valve 155 is connected between conduits 150, 151 and 152 whereby the pilot may selectively prevent jettisoning of the liquid oxygen and the hydrogen peroxide tanks.

The provision of a selectively operable valve 155 for preventing jettisoning of the liquid oxygen and hydrogen peroxide has been made in view of a special problem encountered with the experimental type of aircraft in which the invention system is incorporated. Such aircraft are usually supported within the open bomb bay of a mother aircraft and it is often extremely hazardous to jettison propellants such as liquid oxygen and hydrogen peroxide which may be carried up within the mother aircraft by the air stream.

The operation of the system is as follows: When the aircraft is on the ground, each of the vents on tanks 20, 22 and 24 is opened and propellants are successively pumped into each pair of tanks through the filler openings after members 50, 54 and 55 are manually operated. When each pair of tanks has been substantially filled and fully vented, the filling vents and the filler connections are manually closed. Each of containers 30–33, 35 and 36 is charged with the indicated gas under pressure and control 129 is in the off position as indicated in Fig. 3 whereby both the pressure control valve 126 and the jettison control valve 127 are closed. The aircraft is mounted within the mother plane and the propellant system is in readiness for operation. In this condition, each of the pressure valves 92, 102 and 112 is closed thereby preventing pressurizing of the propellant tanks and the propellants will remain within the tanks. To ensure that there is no leakage out of the tanks, shut-off valves 82 and 87 are initially closed and valve 65 is also biased to closed position. Each of tanks 21, 22 and 24 is vented to atmosphere through valves 95, 105, 115 respectively, and each of the jettison control valves 140, 54 and 145 is biased to closed position. The turbine 61 and the pumps 70, 71 are at rest and the priming valve 74 is closed.

When the aircraft is airborne and it is desired to initiate firing of the rocket engines, control 129 is moved to the P or pressurizing position. Pressurizing valve 126 is thereby opened allowing helium from tank 32 to pass through conduits 130, 117 and 131 to pressure valves 92, 102 and 112 respectively, thereby opening the pressure valves. Simultaneously, fluid pressure is transmitted through conduits 97, 107, 118 to vent valves 95, 105, 115 respectively, thereby closing these valves. Upon opening of the pressure valves 92 and 102, fluid pressure is transmitted to tanks 21 and 22 respectively, thereby pressurizing the alcohol and water mixture and the liquid oxygen tank to force these propellants from the tanks to the fuel pumps. As valve 112 opens, fluid pressure will pressurize tank 24 and simultaneously pass through conduit 120 and valve 121 which is biased to open position and thence to shut-off valves 82 and 87 thereby opening the shut-off valves which were initially biased to closed position. The alcohol and water mixture and the liquid oxygen are then forced by the fluid pressure in the upper tanks to pumps 71 and 70 respectively.

Up to this point, it is evident that it has only been necessary for the pilot to move control 29 from the off position to the P position. The pilot next remotely actuates priming valve 74 to open position. This is necessary since conduits 80 and 72 are very warm compared to the low temperature of the liquid oxygen and this high temperature of the conduits causes the initial portion of the liquid oxygen pumped therethrough to vaporize. Such vapor would cause malfunction of pump 70 and the rocket engines and therefore it is necessary to cool down conduits 80 and 72 prior to firing the engines. The priming valve is left open for approximately 70 seconds or until a stream of liquid oxygen may be observed passing overboard through nozzle 75.

As soon as the upper hydrogen peroxide tank 24 is pressurized, a small flow of hydrogen peroxide passes through orifice 67 in bypass means 66 and enters catalyst chamber 60. This small flow of hydrogen peroxide is just sufficient to warm up the chamber and yet does not create sufficient steam to drive the turbine. This preliminary warming of the catalyst chamber is desirable to eliminate the possibility of an explosion within the chamber should the flow strike the manganese dioxide without it having been initially heated. As soon as conduits 72 and 80 have been sufficiently primed or cooled, valve 74 is closed and pump valve 65 is opened. Hydrogen peroxide will then flow from conduit 56 into the catalyst chamber 60 and produce steam which will in turn drive the turbine and pumps 70, 71. The propellant liquids will then be pumped to the rocket engines where they combine to provide the thrust for the aircraft. When the alcohol and water and the liquid oxygen supplies are exhausted, the pumps are automatically stopped and the aircraft is no longer under power. If any propellant is left in the tanks, it may be desirable to jettison the propellant prior to landing, or if there should be a malfunction prior to operation of the aircraft, it may be desirable to jettison as much of the propellant as possible from the aircraft prior to its being landed with the mother plane. If it is desirable to jettison the propellant, control 129 is moved to the J or jettison position thereby opening jettison control valve 127. This permits helium pressure to open valves 140, 54 and 145 and simultaneously closes valve 121 which in turn interrupts the flow of fluid pressure to shut-off valves 82 and 87 thereby allowing the shut-off valves to be biased to closed position. Since each of the propellant tanks as still pressurized, the propellant within the tanks will be forced overboard through the jettison valves and further flow of propellants to the pumps will be prevented due to the fact that shut-off valves 82 and 87 are closed.

Once the tanks have been substantially evacuated of propellant, the aircraft may be safely landed and control 129 returned to off position whereupon the tanks may be refilled and containers 30-33, 35, 36 recharged in preparation for another flight.

It is apparent from the foregoing that there is provided a new and novel liquid propellant transfer system which provides maximum safety to the pilot eliminating any accidental intermingling of the rocket propellants and which is largely automatic in operation and requires a minimum of the pilot's attention. The transfer system is so arranged as to minimize the center of gravity shift of an aircraft during flight and employs a minimum of components, yet is thoroughly reliable in operation.

Obviously many modifications and variations of the present invention are possible in the light of the above teachings. It is therefore to be understood that within the scope of the appended claims the invention may be practiced otherwise than as specifically claimed.

We claim:
1. A liquid propellant transfer system for rocket engines which comprises first propellant containing means, a first pump, first conduit means providing communication between said first propellant containing means and said first pump, second propellant containing means, a second pump, second conduit means providing communication between said second propellant containing means and said second pump, means for driving said first and second pumps, a first valve connected to said first conduit means and normally biased to closed position thereby preventing propellant flow through said first conduit means, a second valve connected to said second conduit means and normally biased to closed position thereby preventing fuel flow through said second conduit means, pressurizing means for pressurizing said first and second propellant containing means, and means including a third valve normally biased to open position for actuating said first and second valves to open position upon actuation of said pressurizing means thereby allowing propellant flow through said first and second conduits.

2. A system as defined in claim 1 including means normally venting each of said propellant containing means to atmosphere, and means for automatically sealing each of said venting means upon actuation of said pressurizing means.

3. A system as defined in claim 1 including a jettison valve connected to each of said propellant containing means for providing communication between the interior of each of said containing means and atmosphere, each of said jettison valves being normally biased to closed position, jettison actuating means for selectively actuating each of said jettison valves to open position and means for closing said third valve upon actuation of said jettison actuating means thereby causing said first and second valves to close.

4. A system as defined in claim 1 wherein each of said propellant containing means comprises a plurality of hollow, closed tanks in communication with one another.

5. A liquid propellant transfer system for rocket engines which comprises first propellant containing means, a first pump, first conduit means providing communication between said first propellant containing means and said first pump, second propellant containing means, a second pump, second conduit means providing communication between said second containing means and said second pump, means for driving said first and second pumps, a first valve connected to said first conduit means and normally biased to closed position thereby preventing propellant flow through said first conduit means, a second valve connected to said second conduit means and normally biased to closed position thereby preventing propellant flow through said second conduit means, pressurizing means for pressurizing said first and second propellant containing means, and means including a third valve normally biased to open position for actuating said first and second valves to open position upon actuation of said pressurizing means thereby allowing propellant flow through said first and second conduits, means normally venting each of said fluid containing means to atmosphere, means for automatically sealing each of said venting means upon actuation of said pressurizing means, a jettison valve connected to each of said propellant containing means for providing communication between the interior of said containing means and atmosphere, each of said jettison valves being normally biased to closed position, jettison control means for selectively actuating each of said jettison valves to open position, and means for closing said third valve upon actuation of said jettison control means thereby causing said first and second valves to close.

6. A liquid propellant transfer system for rocket engines which comprises first propellant containing means, a first pump, first conduit means providing communication between said first containing means and said first pump, second propellant containing means, a second pump, second conduit means providing communication between said second propellant containing means and said second pump, means for driving said first and second pumps, a first valve connected to said first conduit means and normally biased to closed position thereby preventing propellant flow through said first conduit means, a second valve connected to said second conduit means and normally biased to closed position thereby preventing propellant flow through said second conduit means, third propellant containing means, third conduit means providing communication between third propellant containing means and said pump driving means, and a third valve for selectively interrupting propellant flow through said third conduit, pressurizing means for pressurizing each of said propellant containing means, and means including a fourth valve normally biased to open position for actuating said first and second valves to open position upon actuation of said pressurizing means thereby allowing fuel flow through said first and second conduits.

7. A system as defined in claim 6 including means normally venting each of said propellant containing means to atmosphere, and means for automatically sealing each of said venting means upon actuation of said pressurizing means.

8. A system as defined in claim 6 including a jettison valve connected to each of said propellant containing means for providing communication between the interior of each of said propellant fuel containing means and atmosphere, each of said jettison valves being normally biased to closed position, jettison actuating means for selectively actuating each of said jettison valves to open position, and means for closing said fourth valve upon actuation of said jettison actuating means thereby causing said first and second valves to close.

9. A system as defined in claim 6 wherein each of said propellant containing means comprises a plurality of hollow, closed tanks in communication with one another.

10. A liquid propellant transfer system for rocket engines which comprises first propellant containing means, a first pump, first conduit means providing communication between said first propellant containing means and said first pump, second propellant containing means, a second pump, second conduit means providing communication between said second propellant containing means and said second pump, means for driving said first and second pumps, a first valve connected to said first conduit means and normally biased to closed position thereby preventing propellant flow through said first conduit means, a second valve connected to said second conduit means and normally biased to closed position thereby preventing propellant flow through said second conduit means, third propellant fuel containing means, third conduit means providing communication between said third propellant containing means and said pump driving means, and a third valve for selectively interrupting fuel flow through said third conduit, pressurizing means for pressurizing each of said propellant containing means, and means including a fourth valve normally biased to open position for actuating said first and second valves to open position upon actuation of said pressurizing means thereby allowing propellant flow through said first and second conduits, means normally venting each of said propellant containing means to atmosphere, means for automatically sealing each of said venting means upon actuation of said pressurizing means, a jettison valve connected to each of said propellant containing means for providing communication between the interior of each of said containing means and atmosphere, each of said jettison valves being normally biased to closed position, jettison actuating means for selectively actuating each of said jettison valves to open position, and means for closing said fourth valve upon actuation of said jettison actuating means thereby causing said first and second valves to close.

11. A liquid propellant transfer system for rocket engines which comprises a first pair of closed hollow tanks in communication with one another, a first pump, a first conduit providing communication between one of said first tanks and said first fuel pump, a second pair of closed hollow tanks in communication with one another, a second pump, a second conduit providing communication between one of said second tanks and said second fuel pump, means for driving said first and second pumps, a first valve connected to said first conduit and normally biased to closed position thereby preventing flow through said first conduit, a second valve connected to said second conduit and normally biased to closed position thereby preventing flow through said second conduit, a third pair of closed hollow tanks in communication with one another, a third conduit providing communication between one of said third tanks and said pump driving means, a third valve for selectively interrupting flow through said third conduit, a plurality of closed containers adapted to contain a gas under pressure, a plurality of pressure conduits each of which connects the other tank of each of said pairs of tanks to at least one of said containers, a pressure valve connected to each of said pressure conduits and normally biased to closed position thereby preventing gas flow through said pressure conduits, a pressure control valve for selectively actuating each of said pressure valves to open position, means including a shut-off control valve normally biased to open position for actuating said first and second valves to open position on actuation of said pressure control valve, means normally venting the other tank of each of said pairs of tanks to atmosphere, means for automatically sealing each of said venting means upon actuation of said pressure control valve, a jettison valve connected to said one tank of each of said pairs of tanks for providing communication between the interior of said one tank and atmosphere, each of said jettison valves being normally biased to closed position, a jettison control valve in communication with each of said jettison valves for selectively actuating said jettison valves to open position, means for closing said shut-off control valve upon actuation of said jettison control valve thereby causing said first and second valves to close, and means for selectively operating said pressure control valve and said jettison control valve.

12. A system as defined in claim 11 including a manually operable valve for selectively interrupting communication between said jettison control valve and said jettison valves for said one tank of said second and third pairs of tanks thereby preventing actuation of said last mentioned valves.

13. In a system as defined in claim 11, said first pair of tanks being substantially filled with an alcohol and water mixture, said second pair of tanks being substantially filled with liquid oxygen, and said third pair of tanks being substantially filled with hydrogen peroxide.

14. A system as defined in claim 13 including a priming valve connected to said second pump for initially cooling said second conduit.

15. A system as defined in claim 11 wherein said pump driving means comprises a turbine, a catalyst chamber connected to said third conduit between said third valve and said turbine, and means including an orifice for bypassing said third valve.

References Cited in the file of this patent

UNITED STATES PATENTS

| | | |
|---|---|---|
| 2,016,654 | Shippy et al. | Oct. 8, 1935 |
| 2,397,657 | Goddard | Apr. 2, 1946 |

FOREIGN PATENTS

| | | |
|---|---|---|
| 680,717 | Great Britain | Oct. 8, 1952 |
| 702,779 | Great Britain | Jan. 20, 1954 |